United States Patent
Studte et al.

(10) Patent No.: US 9,528,036 B2
(45) Date of Patent: Dec. 27, 2016

(54) LOW-VOC DIALKYL-FUNCTIONAL ALKOXYSILOXANES, PROCESSES AND USE THEREOF AS HYDROPHOBIZING IMPREGNATING AGENTS FOR MINERAL BUILDING MATERIALS

(71) Applicants: Christopher Studte, Freiburg (DE); Spomenko Ljesic, Rheinfelden (DE)

(72) Inventors: Christopher Studte, Freiburg (DE); Spomenko Ljesic, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 45 days.

(21) Appl. No.: 14/629,177

(22) Filed: Feb. 23, 2015

(65) Prior Publication Data
US 2015/0284615 A1    Oct. 8, 2015

(30) Foreign Application Priority Data

Apr. 3, 2014    (DE) .................. 10 2014 206 359

(51) Int. Cl.
| | |
|---|---|
| *C09K 3/18* | (2006.01) |
| *C04B 41/64* | (2006.01) |
| *C09D 183/04* | (2006.01) |
| *C08G 77/04* | (2006.01) |
| *C04B 41/00* | (2006.01) |
| *C04B 41/49* | (2006.01) |

(52) U.S. Cl.
CPC .............. *C09K 3/18* (2013.01); *C04B 41/009* (2013.01); *C04B 41/4977* (2013.01); *C04B 41/64* (2013.01); *C08G 77/045* (2013.01); *C09D 183/04* (2013.01)

(58) Field of Classification Search
CPC .... C04B 41/009; C04B 41/4977; C04B 41/64; C08G 77/045; C09D 183/04; C09K 3/18
USPC ................................................... 106/287.14
See application file for complete search history.

(56) References Cited

U.S. PATENT DOCUMENTS

| | | | |
|---|---|---|---|
| 4,125,551 A | 11/1978 | Petersen | |
| 4,716,051 A | 12/1987 | Rödder | |
| 5,282,998 A | 2/1994 | Horn et al. | |
| 5,932,757 A | 8/1999 | Standke et al. | |
| 6,685,766 B2 | 2/2004 | Standke et al. | |
| 6,767,982 B2 | 7/2004 | Standke et al. | |
| 6,841,197 B2 | 1/2005 | Standke et al. | |
| 8,394,885 B2 | 3/2013 | Friedel et al. | |
| 8,679,247 B2 | 3/2014 | Friedel et al. | |
| 8,741,038 B2 | 6/2014 | Friedel et al. | |
| 8,999,053 B2 | 4/2015 | Friedel et al. | |
| 2013/0040058 A1 | 2/2013 | Friedel et al. | |
| 2013/0085210 A1 | 4/2013 | Friedel et al. | |
| 2013/0087080 A1 | 4/2013 | Friedel et al. | |
| 2013/0092052 A1 | 4/2013 | Friedel et al. | |
| 2014/0330035 A1 | 11/2014 | Ljesic et al. | |
| 2014/0374656 A1 | 12/2014 | Friedel et al. | |

FOREIGN PATENT DOCUMENTS

| | | | |
|---|---|---|---|
| GB | 618459 | * | 2/1949 |
| JP | 2002-193980 A | | 7/2002 |
| JP | 2004-2299 A | | 1/2004 |
| JP | 2007-524732 A | | 8/2007 |
| WO | WO 2011/038956 A1 | | 4/2011 |
| WO | WO 2011/128127 A1 | | 10/2011 |
| WO | WO 2011/128129 A1 | | 10/2011 |
| WO | WO 2012/139803 A1 | | 10/2012 |
| WO | WO 2014/079612 A1 | | 5/2014 |

OTHER PUBLICATIONS

European Search Report issued Jul. 23, 2015 in Patent Application No. 15157745.9 (with English Translation of Categories of Cited Documents).

K. A. Adrianov, et al., "The Hydrolysis Reaction of the Higher Alkylmethyldichlorosilanes" Journal of Organometallic Chemistry, vol. 8, 1967, pp. 443-450.

* cited by examiner

*Primary Examiner* — Porfirio Nazario Gonzalez
(74) *Attorney, Agent, or Firm* — Oblon, McClelland, Maier & Neustadt, L.L.P.

(57) ABSTRACT

Low-VOC compositions of dialkyl-functional siloxane oligomers, especially of methylalkylalkoxysiloxanes, and processes for producing them are provided. Additionally methods for hydrophobizing porous mineral substrates employing the low-VOC compositions, in the course of which few or no volatile organic compounds are released, are provided.

20 Claims, No Drawings

LOW-VOC DIALKYL-FUNCTIONAL ALKOXYSILOXANES, PROCESSES AND USE THEREOF AS HYDROPHOBIZING IMPREGNATING AGENTS FOR MINERAL BUILDING MATERIALS

CROSS REFERENCE TO RELATED APPLICATIONS

This application claims priority to German Application No. 102014206359.0, filed Apr. 3, 2014, the disclosure of which is incorporated herein by reference in its entirety.

BACKGROUND OF THE INVENTION

The invention relates to low-VOC/VOC-free compositions of dialkyl-functional alkoxysiloxane oligomers, especially of methylalkylalkoxysiloxanes, to processes for producing them and to their use for hydrophobizing porous mineral substrates, in the course of which few or no volatile organic compounds are released.

It has long been known that alkyl-functional silanes and siloxanes are able to produce hydrophobizing properties on porous mineral substrates such as concrete, brick and lime sandstone, particularly of a few examples. For instance, in particular, monomeric short-chain alkylalkoxysilanes, which are used in solvent-free form (EP 0 101 816 B1), and low-viscosity alkylalkoxysiloxanes having a degree of oligomerization of 3-6 (DE100 56 344 A1) are distinguished by effective impregnation to depth.

It is known that monomeric alkylalkoxysilanes in the course of the application release a certain amount of volatile organic compounds. The VOC content (VOC stands for "volatile organic compounds") can be reduced if oligomeric silane systems are used, such as alkylalkoxysiloxanes, for example. These have advantages in terms of their use as hydrophobizing agents, since in the course of application they release volatile organic compounds to less of an extent than do monomeric silane systems. These silane systems have the advantage that they achieve a somewhat lower depth of penetration. Moreover, high-viscosity hydrophobizing agents may lead to the discolouration or darkening of the substrate surface or to shiny or oily surfaces, particularly in the case of very dense substrates such as facing concrete, for example.

It is known, furthermore, that architectural preservatives are employed in the form of a solution or in a liquid or pasty or creamy form, in other words as a high-viscosity emulsion (e.g. EP 0 814 110, EP 1 205 481, EP 1 205 505, WO 06/081892; DE1020005004871). When aqueous emulsions and high-viscosity pastes are used that are based on alkylalkoxysilanes, alkylalkoxysiloxanes or blends thereof, the breaking of the emulsion or paste and hydrolysis are followed likewise by formation of alcohols, which are released into the environment as VOCs.

Silicone oils and solutions thereof, which were used as one of the first hydrophobizing agents for protection from penetration by water and pollutants dissolved in water on mineral substrates, do indeed have a low VOC content, but do not exhibit reactivity with the substrate, and obtain only very low depths of penetration. They lead, moreover, to instances of darkening and to sticky surfaces.

In recent years, the emissions guidelines have been tightened in many parts of the world. For example, in one part of the Federal State of California in the USA, a VOC content of less than 100 g/L is required for architectural preservatives. It has to be assumed that these or similar guidelines will become established in other parts of the USA as well and in the rest of the world.

EP 0 579 453B1 describes a process for producing a mixture of monomeric alkoxysilanes, alkoxy-functional siloxanes and silanols and the use thereof for the hydrophobizing of building materials. The partly prehydrolysed mixtures described release alcohols to significantly less of an extent on contact with moisture and on complete hydrolysis.

EP 0 814 110 B1 teaches a process for producing oligomeric mixtures of condensed alkylalkoxysiloxanes which release less VOC. These relatively low-VOC alkylalkoxysilanol oligomers as well were developed in particular for the hydrophobizing of mineral surfaces. The products obtained from them, produced with addition of 1.2 mol $H_2O$/mol Si, lead to darkening of the substrate surface when applied to dense substrates such as facing concrete, for example, and exhibit low depths of penetration.

EP 1 205 481 B1 discloses an oligomers mixture made up of n-propylethoxysiloxanes with different degrees of oligomerization, prepared with addition of 0.65-0.85 mol $H_2O$/mol Si, and the use thereof for the treatment of mineral substrates. The depth of penetration was tested only on lime sandstone, which is significantly more porous than concrete.

U.S. Pat. No. 5,112,393 describes a method for hydrophobizing masonry with low-VOC organoalkoxysilanes, the VOC content of the product according to the invention being 220 g/L.

WO 2013/043725 discloses an emulsion of cyclic methyl siloxanes having a VOC content <100 g/L. However, no detail is given for the substrate tested, and so it is not apparent whether the tests were carried out on concrete plaques (0051) or on mortar cubes (0052).

EP 0 538 555 A1 discloses n-octyltrialkoxysilane-containing aqueous emulsions for the impregnation of mineral building materials. The VOC content is more than 300 g/L. EP 0 340 816A2 and EP 0 412 515A1 also disclose emulsions containing n-octyltriethoxysilane. Owing to the three ethoxy groups per silane module, the VOC content is 350 g/L.

DE 28 49 108 discloses octylmethylcyclotetrasiloxane in connection with the production of silyl phosphates. A process for producing the octylmethylcyclotetrasiloxanes is not disclosed.

In the case of the present invention, the object was to provide a composition which releases volatile organic substances to a very small extent during setting. Furthermore, the compositions of the invention are to be outstandingly suitable for hydrophobizing mineral substrates. Advantageously in that case, small amounts, or significantly smaller amounts, of alcohols are to form as a result of the setting, and so escape into the environment. Furthermore, the compositions are to bring about few or no discolouration on the substrates treated.

Setting in the present context means the possible reaction of alkoxysilyl or hydroxysilyl groups with other reactants, such as with reactive groups of the materials or substrates treated, for example. For instance, pure silicones, without reactive alkoxy groups or hydroxyl groups, are unable to set with a substrate. Therefore, pure silicones are also washed off more readily from the treated substrates, depending on weathering.

SUMMARY OF THE INVENTION

These and other objects are achieved by the present invention, the first embodiment of which includes a composition comprising: a dialkyl-functional siloxane oligomer of formula (I):

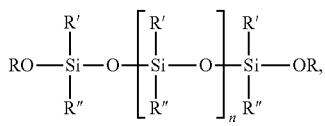

and, optionally, a dialkyl-functional cyclic siloxane oligomer of formula (II):

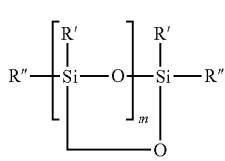

wherein each R' is independently a linear, branched or cyclic alkyl group having 3 to 8 C atoms, each R" is independently an alkyl group having 1 to 3 C atoms, each R is independently hydrogen or an alkyl group having 1 to 3 C atoms, n is an integer from 0 to 10 and m is an integer from 2 to 10.

In another embodiment, the present invention includes a process for producing the composition of the first embodiment, comprising: subjecting at least one silane of formula (III) to hydrolysis and condensation in the presence of a diluent or reaction medium and a molar amount of water based on moles of silicon atoms in the silanes of the formula III, and optionally removing the diluent or the reaction medium:

$$R'-SiR'(X)_2 \qquad (III),$$

wherein R' is a linear or branched alkyl group having 3 to 8 C atoms, R" is an alkyl group having 1 to 3 C atoms, each X is independently halogen, —OR or —OH, and R is independently an alkyl group having 1 to 2 C atoms.

In another embodiment, the present invention includes a method for hydrophobizing a surface of a substrate or for hydrophobizing materials in mass, comprising applying the composition according to the first embodiment to the substrate surface or to the material mass.

Particular configurations of the invention and preferred embodiments are elucidated in detail in the following description and Claims.

DESCRIPTION OF THE PREFERRED EMBODIMENTS

In this specification, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. Where a numerical limit or range is stated, the endpoints are included. Also, all values and subranges within a numerical limit or range are specifically included as if explicitly written out.

It has surprisingly been found that from dialkyldichlorosilanes, more particularly from octylmethyldichlorosilane, through a controlled esterification and condensation reaction with an ethanol-water mixture and subsequent distillative removal of the hydrolysis alcohol and excess alcohol under reduced pressure, a low-viscosity reactive dialkylsiloxane, preferably octylmethylsiloxane or a mixture of octylmethylsiloxanes, may be obtained, with an amount of alkoxy groups or VOC content that can be adjusted via the amounts of water per mol Si.

Surprisingly it has been found that methylalkyldiethoxysiloxanes have not only very good hydrophobizing properties but also a high reactivity and alkali stability in and/or on the substrate, and release only very small amounts of VOC. The compositions obtained by the process of the invention are homogeneous, clear to opalescent liquids which are of low viscosity and are stable on storage, and can be used either alone or in conjunction with monomeric alkylsilanes and/or solvents.

The viscosity (20° C.) according to DIN 53015 of the compositions of the invention may preferably be between 1 mPa·s to 200 mPa·s, more particularly from 1 mPa·s to 50 mPa·s, advantageously from 2 mPa·s to 30 mPa·s, more preferably from 3 mPa·s to 20 mPa·s, very preferably from 3 mPa·s to 10 mPa·s or 11 mPa·s or 30 mPa·s.

The amount of diluents, more particularly of free alcohol, in the composition is preferably less than 5 wt % in relation to the overall composition, more preferably less than 1 wt %, very preferably less than 1 wt % or less than 0.1 to 0.0 wt % down to the detection limit.

The present invention provides a composition for hydrophobizing porous mineral substrates that releases very few volatile organic compounds during application and whose viscosity (20° C.) is less than or equal to 50 mPa·s and as a result permits very good impregnation to depth.

The compositions of the invention are notable, furthermore, for a very good reduction in the water absorption of a mineral substrate treated therewith and for a high depth of penetration in conjunction with very low VOC content. A high depth of penetration on concrete is understood to be a depth of greater than or equal to 2 mm in EN 196 CEM I 42.5 concrete with a w/c of 0.5. The treatment produces virtually no change in the appearance of the treated substrate in this case.

In this sense, compositions of the invention may be used with particular advantage for the hydrophobizing of porous mineral substrates, preferably silicatic materials, especially building materials such as concrete, fibre cement, clay, brick, marble, granite, sandstone or lime sandstone, to name but a few examples.

The invention provides compositions comprising dialkyl-functional siloxane oligomers, especially for impregnating mineral building materials on the surface and/or in the mass, with the dialkyl-functional siloxane oligomers conforming to the general formula I

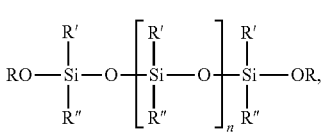

wherein
R' in each case independently is a linear, branched or cyclic alkyl group having 3 to 8 C atoms, more particularly R' is an alkyl group having 8 C atoms, more particularly an octyl group,
R" in each case independently is an alkyl group having 1 to 3 C atoms, more particularly a methyl, ethyl, isopropyl or n-propyl group, preferably a methyl group, and R in each case independently is an alkyl group having 1 to 3 C atoms, or is a hydrogen, the groups R being identical or different, R is preferably a methyl or ethyl group, and n is an integer from 0 to 10, more particularly 0, 1, 2, 3, 4, 5, preferably 1 or 2, or a mixture of dialkyl-functional siloxane oligomers.

R' in each case independently is a linear, branched or cyclic alkyl group having 3, 4, 5, 6, 7 or 8 C atoms.

In the compositions it may be possible with preference for n to be on average a number between 1 to 5, such as n on average 1.1 to 1.8, more particularly n being on average 1.3 to 1.5.

Preferred compositions may comprise alkylmethylalkoxysiloxanes of the formula I, especially reactive alkylmethylsiloxanes, preferably octylmethylethoxysiloxanes, with n being 0, 1, 2, 3, 4 or 5. A siloxane is deemed reactive if it possesses at least one reactive alkoxy group and/or at least one reactive hydroxyl group.

Likewise provided by the invention are compositions having at least one dialkyl-functional siloxane oligomer of the general formula I where R' is a linear or branched octyl group, more particularly n-octyl and/or isooctyl group, R" is a methyl group and R is an alkyl group having 1 to 2 C atoms or a hydrogen, the groups R being able to be identical or different, with n being an integer from 0 to 10, more particularly n being 0, 1, 2, 3, 4 or 5, preferably n being an integer from 1 to 5, more preferably n being 1 or 2. Preferred oligomers are those having two to four silyl units.

Particularly preferred are dialkyl-functional siloxane oligomers of the general formula I, where R' is selected from n-octyl and 2,2,4-trimethylpentyl(isooctyl) and R" is a methyl group and R is a methyl or ethyl group, preferably ethyl. Likewise particularly preferred are siloxane oligomers of the general formula I, where R' is selected from isobutyl and n-propyl and R" is a methyl group and R is a methyl or ethyl group, preferably ethyl.

According to one alternative, the invention likewise provides compositions with at least one dialkyl-functional siloxane oligomer of the general formula I, where R' is selected from propyl, n-propyl, isopropyl, butyl, isobutyl, n-butyl, tert-butyl, n-octyl, 2 methylheptyl, 3-methylheptyl, 4-methylheptyl, 2,2-dimethylhexyl, 2,3-dimethylhexyl, 2,4-dimethylhexyl, 2,5-dimethylhexyl, 3,3-dimethylhexyl, 3,4-dimethylhexyl, 3-ethylhexyl, 2,2,3-trimethylpentyl, 2,2,4-trimethylpentyl(isooctyl), 2,3,3-trimethylpentyl, 2,3,4-trimethylpentyl, 3-ethyl-2-methylpentyl and 3-ethyl-3-methylpentyl, 2,2,3,3-tetramethylbutyl, cycloheptylethylene, methylcyclohexylmethylene, cycloheptylmethylene and methylcycloheptyl. R' may further be selected from linear, cyclic and/or branched isomers of pentyl, hexyl and heptyl.

Likewise provided by the invention are compositions comprising dialkyl-functional siloxane oligomers as a mixture of dialkyl-functional linear siloxane oligomers of the general formula I. Likewise preferred alternatively are compositions comprising mixtures of dialkyl-functional linear siloxane oligomers of the formula I with dialkyl-functional cyclic siloxane oligomers of the general formula II.

Further provided by the invention are compositions comprising dialkyl-functional siloxane oligomers in a mixture with dialkyl-functional cyclic siloxane oligomers of the general formula II,

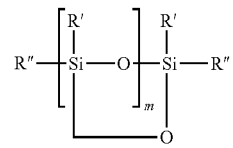

wherein

R' in formula II in each case independently is a linear or branched alkyl group having 3 to 8 C atoms, R' being preferably an alkyl group having 8 C atoms, more particularly an octyl group, R" in formula II in each case independently is an alkyl group having 1 to 3 C atoms, in particular R" is a methyl, ethyl, isopropyl or n-propyl group, and m is an integer from 2 to 10, more particularly m is 2, 3, 4 or 5, preferably m is 2, 3 or 4.

Furthermore, R', as defined above, may be an isomer of an alkyl group having 8 C atoms. Moreover, R' in each case independently may be a linear, branched or cyclic alkyl group having 3, 4, 5, 6 or 7 C atoms.

Thus in a first embodiment, the present invention provides a composition comprising: a dialkyl-functional siloxane oligomer of formula (I) and optionally, a dialkyl-functional cyclic siloxane oligomer of formula (II), as described above.

Corresponding to a further alternative, compositions according to the present invention may comprise dialkylsiloxane oligomers of the formula I and optionally II in a molar ratio of from 100:1 to 1:100, more particularly from 10:1 to 1:10. According to one particularly preferred alternative, a composition of the invention comprises the dialkylsiloxane oligomers of the formula I and optionally II in a molar ratio of from 1:100 to 1:1.

According to a further preferred alternative, compositions are claimed which have the dialkylsiloxane oligomers of the formula I and optionally of the formula II with an amount of 0.01 to 99.9 wt % in the composition. The amount of the siloxane oligomers in the compositions may be altered arbitrarily and adapted to the particular application. Corresponding to one preferred alternative, a composition may comprise greater than 90 wt % of cyclic dialkylsiloxane oligomers of formula II, more particularly greater than or equal to 95 wt %, preferably greater than or equal to 98 wt %, more preferably greater than or equal to 99 wt %, and optionally to 100 wt % of siloxanes, more particularly in the overall composition, and also linear dialkylsiloxane oligomers of the formula I. A preferred composition has the dialkylsiloxane oligomers with m=3, more particularly having a content of greater than or equal to 90 wt % to 99.9 wt % in relation to the composition, with preferably 0.1 to 10 wt % of siloxane oligomers of the general formula II to a siloxane content of 100 wt %. Corresponding to a further alternative, a composition comprises less than or equal to 50 wt % of cyclic siloxane oligomers of the formula II, more particularly less than or equal to 30 wt %, preferably less than or equal to 20 wt %, more preferably less than or equal to 10 wt %, and to 100 wt % of siloxanes, and also linear siloxane oligomers of the formula I. The 100 wt % is considered preferably in relation to the overall composition. The amount that is preferred in each case is dependent on the application—accordingly, for mineral applications, the amount is preferably 75 to 95 wt % of siloxanes of the formula II and 5 to 25 wt % of siloxane oligomers of the formula I.

Alternatively preferred compositions may comprise greater than 90 wt % of linear dialkylsiloxane oligomers of the formula I, more particularly greater than or equal to 95 wt %, preferably greater than or equal to 98 wt %, more preferably greater than or equal to 99 wt %, and optionally to 100 wt % cyclic dialkylsiloxane oligomers of the formula II in relation to 100 wt % of siloxanes, in particular in relation to the overall composition. According to a further preferred alternative, these compositions may comprise linear dialkylsiloxane oligomers with n=1 or 2.

The linear dialkylsiloxane oligomers with n=1 or 2 are present preferably at greater than or equal to 10 wt % in the composition in relation to the siloxanes, preferably in relation to the overall composition, preferably at greater than or equal to 50 wt %, more preferably at greater than or equal to 80 wt %, with preference at greater than or equal to 90 wt %.

A particular advantage of the compositions of the invention is their low VOC content, which for the dialkylsiloxane oligomers with n=1 to 2, the oligomers of which have on average a degree of oligomerization (degree of oligomerization=n*) of 3 to 4, preferably of 3.2 to 3.6, more preferably of 3.3 to 3.5, in the case of compositions having a 98 to 100 wt % content of dialkylsiloxanes for C8-alkyl-methyl-siloxanes, is between 66 to 72 g/L for linear siloxanes. The degree of oligomerization is understood as the number of silicon atoms and/or silyl groups in the siloxane. In the cases of blends of linear oligomers with cyclic siloxanes which have no reactive terminal alkoxy groups, the VOC content may be lowered further. In blends of alkoxy- and hydroxy-functional siloxanes with cyclic siloxanes of the formula II, the VOC content may be lowered from greater than 300 g/L in siloxane oligomers with an amount of greater than or equal to 98 wt %, through addition of cyclic siloxane oligomers of the formula II, to below 150 g/L, preferably to below 100 g/L.

Optimum results in terms of effective depth of penetration into the porous mineral building materials, with a very low VOC content and at the same time with values for reduced water absorption, may be obtained with linear siloxanes of the n-octylmethyl-siloxanes having a degree of oligomerization (n*) of 3.5, i.e. the indices n are between 1 and 2, with n being on average around 1.5. The reduction in the water absorption may be raised to 92 to 96%. With pure cyclic siloxane oligomers it is possible to obtain the lowest VOC contents, but the reduction in the water absorption is 40%.

Compositions which in addition to the siloxanes of the formula I and optionally of the formula II also comprise organosilanes or organosiloxanes of the formula IV may exhibit the best results in terms of the depth of penetration, low VOC contents and good results in the reduction of water absorption, as shown by Example 7.

The invention also provides compositions comprising, in addition to the at least one dialkylsiloxane oligomer of the formula I, at least one organosilane or organosiloxane of formula IV $$R^1\text{—}Si(O)_y R^2_z \quad (IV),$$

wherein

R$^1$ is a linear, branched or cyclic alkyl group having 3 to 20 C atoms, more particularly having 3 to 8 C atoms, preferably propyl, butyl, pentyl, hexyl, heptyl, octyl, R$^2$ in each case independently is a linear or branched alkoxy group having 1 to 4 C atoms, more particularly 1 to 2 C atoms, or is a hydroxyl group, the groups R$^2$ being able to be identical or different, R$^2$ more particularly being methyl or ethyl, where y is 0 to 1.5 z is 0, 1, 2 or 3, and y=1.5 for z=0, y=1 for z=1, y=0.5 for z=2 and y=0 for z=3, or a mixture thereof.

Preferred siloxanes of the formula IV may comprise R$^1$—Si(O$_{1/2}$)(R$^2$)$_2$, R$^1$—Si(O$_{1/2}$)$_2$(R$^2$). Preferred silanes of the formula IV are R$^1$—Si(R$^2$)$_3$.

Stated below are preferred organosilanes of the formula IV which may be used in the composition of the invention, and also their at least partial hydrolysis and/or condensation products:

n-C3H7Si(OCH3)3, n-C3H7Si(OC2H5)3, i-C3H7Si(OCH3)3, i-C3H7Si(OC2H5)3, n-C4H9Si(OCH3)3, n-C4H9Si(OC2H5)3, i-C4H9Si(OCH3)3, i-C4H9Si(OC2H5)3, n-C5H11Si(OCH3)3, n-C5H11Si(OC2H5)3, i-C5H11Si(OCH3)3, i-C5H11 Si(OC2H5)3, n-C6H13Si(OCH3)3, n-C6H13Si(OC2H5)3, i-C6H13Si(OCH3)3, i-C6H13Si(OC2H5)3, n-C8H17Si(OCH3)3, n-C8H17Si(OC2H5)3, i-C8H17Si(OCH3)3, i-C8H17Si(OC2H5)3, n-C10H21Si(OCH3)3, n-C10H21Si(OC2H5)3, i-C10H21Si(OCH3)3, i-C10H21Si(OC2H5)3, n-C16H33Si(OCH3)3, n-C16H33Si(OC2H5)3, i-C16H33Si(OCH3)3, i-C16H33Si(OC2H5)3, or partial condensates of one or more of the stated alkylalkoxysilanes, or a mixture of the stated alkylalkoxysilanes, a mixture of the partial condensates, or a mixture of alkylalkoxysilanes and partical condensates.

The invention also provides compositions, and also the use of these compositions, comprising, in addition to the at least one dialkylsiloxane oligomer of the formula II, preferably where R' is an alkyl group having 8 C atoms, at least one silane of the general formula III $$R'\text{—}SiR''(X)_2 \quad (III),$$

wherein

R' is a linear or branched alkyl group having 8 C atoms, more particularly an octyl group, R" is an alkyl group having 1 to 3 C atoms, more particularly methyl, ethyl, isopropyl or n-propyl group, and X in each case independently is selected from halogen, —OR and —OH, where the groups R are identical or different and R is an alkyl group having 1 to 2 C atoms.

The invention also provides the use of compositions comprising at least one dialkylsiloxane oligomer of the formula II, especially with m=3, for the hydrophobizing of substrates, of surfaces of substrates and/or of substrates in the mass. In one preferred utility the compositions of the present invention may be used for the hydrophobizing of mineral building materials, such as brick, concrete, lime sandstone, render, or else plaster.

The invention also provides a process for producing compositions, and also compositions obtainable by the process, comprising at least one dialkyl-functional siloxane oligomer of the general formula I, by subjecting at least one silane of the general formula III $$R'\text{—}SiR''(X)_2 \quad (III),$$

wherein
R' is a linear or branched alkyl group having 8 C atoms, more particularly an octyl group,
R" is an alkyl group having 1 to 3 C atoms, more particularly methyl, ethyl, isopropyl or n-propyl group, and
X in each case independently is selected from halogen, —OR and —OH, where the groups R are identical or different and R is an alkyl group having 1 to 2 C atoms, and to hydrolysis and condensation in the presence of a diluent or reaction medium and of a defined amount of water, based on the silicon atoms in the silanes of the formula III, and optionally removing the diluent or reaction medium.

According to one preferred process variant, X is halogen, with halogen selected from chlorine and bromine. With particular preference, halogen is chlorine. It is particularly preferred in this context if no catalyst is added for the hydrolysis and/or condensation.

The invention also provides a process for producing compositions, and compositions obtainable by the process, more particularly comprising siloxane oligomers of the formula II.

The process may be carried out preferably with a defined amount of water relative to moles of the silicon atoms in the silanes of the formula III, with preferably 0.3 to 1.0 mol of water per mole of silicon atoms in the silanes of the formula III (mol $H_2O$/mol Si) being added or being present in the composition, and optionally being added at least partly via the diluent. Preference is given to 0.3 to 0.9 mol of water per mole of silicon atoms (mol $H_2O$/mol Si), preferably 0.4 to 0.8 mol $H_2O$/mol Si, more preferably 0.4 to 0.6 mol $H_2O$/mol Si, with further preference 0.4 to 0.6 mol $H_2O$/mol Si, in particular with a fluctuation of plus/minus 0.25 mol, preferably of plus/minus 0.1 mol. Alternatively, 0.4 mol $H_2O$/mol Si, 0.5 mol $H_2O$/mol Si, 0.6 mol $H_2O$/mol Si, 0.7 mol $H_2O$/mol Si, 0.8 mol $H_2O$/mol Si, in particular in each case with a fluctuation range of plus/minus 0.25 mol in relation to the water, is added.

According to one particularly preferred alternative, an alcohol, aqueous alcohol or alcohol mixture may be used as diluent or reaction medium in the process. Advantageously the diluent is an alcohol, more particularly methanol, ethanol or a mixture comprising at least one alcohol and optionally with a defined amount of water. Customary alcohols such as propanol and butanol among others are familiar to the skilled person. In processes in which at least one silane of the formula III is used where X is halogen, more particularly chlorine, the alcohol is a reaction medium.

Equally, according to one alternative, the process may be carried out with at least one silane of the formula III where a) X is —OR or —OH or b) X is —OR with optionally a content of —OH groups, the groups R being identical or different and R being an alkyl group having 1 to 2 C atoms. The process can also be carried out with a defined mixture of silanes of the formula III whose groups X comprise according to alternative a) X in each case —OR and chlorine or b) X in each case —OH and —OR.

Likewise provided by the invention is a process in which the hydrolysis and/or condensation may take place in the presence of a catalyst; in particular, the catalyst is removed from the composition after the hydrolysis and/or condensation. Preferred catalysts are acidic catalysts, such as inorganic acids, organic carboxylic acids, preferably volatile acids, such as HCl, formic acid, acetic acid, lactic acid, which can be separated off at least partly in a distillation through defined conditions. In process alternatives in which no hydrogen chloride is present, it may be sensible to add a catalyst in order to implement the process.

The process may be carried out preferably within a defined temperature range. Accordingly, the hydrolysis and/or condensation in the process takes place preferably in the temperature range from 25 to 80° C., in particular over a period of 10 minutes to 10 hours, preferably between 30 minutes and 2 hours, more preferably for about one hour, and the diluent, especially the alcohol, and/or the water are preferably removed subsequently from the composition under reduced pressure at a composition temperature of less than or equal to 70° C., such as the liquid-phase temperature. The diluent is removed preferably as an azeotrope with water. The diluent may be removed more preferably at a composition temperature of less than or equal to 60° C.

One particularly preferred process variant is described hereinafter, with the process comprising introducing the at least one silane of the general formula III,
a) adding the diluent or reaction medium, more particularly at least one alcohol, and the water in the form of an alcohol/water mixture, or b) separately adding the diluent or reaction medium alcohol and water,
carrying out hydrolysis and/or condensation in the temperature range from 25 to 80° C.,
more particularly at less than or equal to 75° C., preferably for 20 minutes to 2 hours, preferably between 30 minutes to 1.5 hours,
removing the diluent or reaction medium alcohol and optionally water under reduced pressure, more particularly at around 1 mbar and at a composition temperature below 65° C., more particularly below 60° C., as for example the liquid-phase temperature, and obtaining the composition.

The siloxanes may advantageously also be prepared in accordance with EP 0 814 110, EP 1 205 481, and EP 1 205 505.

Likewise provided by the invention are formulations comprising a composition of the invention, or a composition obtained by the process of the invention, comprising at least one auxiliary and optionally solvents and/or additives. The formulation may be a liquid formulation, powder formulation, paste formulation, an emulsion, a dispersion or a cream-like formulation.

Accordingly, compositions of the invention may be present, and applied, as a concentrate, as a diluted formulation or as an oil phase in aqueous, pasty emulsions of low to high viscosity. From a technical standpoint, the production of aqueous emulsions is described comprehensively in DE 10 2005 004 871 A1 or EP 0 538 555 B1, for example. The compositions of dialkyl-functional alkoxysiloxane oligomers according to the invention may also be prepared as formulations in accordance with EP 0 814 110, EP 1 205 481, EP 1 205 505 or WO 06/081892.

In order to improve the applications properties, the present composition may also be formulated by known methods as an aqueous emulsion of low or high viscosity, with the viscosity of the active ingredient composition oil phase generally remaining unchanged in that case. In that case the formulation of the active ingredients as an aqueous emulsion, added to the concrete mixing water, is preferred, in order to ensure extremely homogeneous distribution.

Besides the active ingredient components, the composition of the invention may also comprise, as additional components, solvents and/or solubilizers, such as mineral oil, benzine hydrocarbons, additionally diisotridecyl adipate, water, emulsifiers, rheological assistants, optionally also thickening assistants, such as finely divided clay, precipitated silica, fumed silica, or a corresponding mixture thereof.

The invention also provides the use of the compositions for the low-VOC hydrophobizing of surfaces of substrates and for the hydrophobizing of materials in the mass with a reduction in water absorption of greater than or equal to 30% and a VOC content of less than or equal to 100 g/L. Preferred uses of the compositions permit a reduction in the water absorption of the substrates of greater than or equal to 50% in relation to the untreated substrates, preferably greater than or equal to 70%, more preferably greater than or equal to 90%, and the release of a VOC content of less than or equal to 100 g/L, more particularly of less than or equal to 90 g/L, preferably less than or equal to 80 g/L, more preferably less than or equal to 75 g/L. The above figures relate to compositions having a siloxane content of greater than or equal to 90 wt %, more particularly of greater than or equal to 98 wt %, preferably of greater than or equal to 99 wt % in the overall composition. In accordance with the invention, the siloxanes are understood to be those of the formula I and optionally of the formula II, and also, alternatively, compositions comprising siloxanes of the formula II with a content of silanes of the formula III.

Further provided by the invention is the use of compositions of the invention or of compositions obtainable by a process of the invention for hydrophobizing surfaces of substrates and for hydrophobizing materials in the mass, for hydrophobizing mineral building materials, especially porous mineral building materials, for hydrophobizing porous mineral substrates, preferably silicatic materials, more particularly building materials such as concrete, fibre cement, clay, brick, marble, granite, sandstone or lime sandstone, bricks, screed, render, plaster, for hydrophobizing silicatic composites, such as natural stone/quartz composites, of the kind used, for example, for producing bath ceramics and/or kitchen panels, and for ceramics, natural building materials, composite materials, for forming water or water-vapour barriers, as additive in compositions for forming water barriers, wood composites, wood polymers (boards, wood blocks), as additive in compositions comprising polymers, in coating materials, as additive in adhesives for forming water and vapour barriers, as drying agent, anti-foam agent, care composition adjuvant, more particularly in cosmetic formulations, textile formulations or formulations for natural or synthetic leather, as textile or fibre composition adjuvant.

The composition may be used by spraying, spreading, rolling or knifecoating. The composition is applied advantageously in an amount of more than 50 g/m$^2$, more particularly of more than 100 g/m$^2$, to the substrate surface, more particularly to the concrete surface.

The invention is elucidated in more detail by the following examples, which do not, however, restrict the subject matter of the invention.

Method for determining the VOC content: The nonvolatile fraction was determined in accordance with ASTM D 5095-91 "Standard Test Method for Determination of the Nonvolatile Content in Silanes, Siloxanes and Silane-Siloxane Blends used in Masonry Water Repellents", and the VOC content was calculated according to ASTM D 3960.

EXAMPLES

All figures below are in parts and wt % based on the total mass of the final formulation.

Example 1

A 500 ml stirred laboratory reactor with temperature sensor, dropping funnel and reflux condenser was charged under nitrogen blanketing with 200 g of n-octylmethyldichlorosilane, followed by metered addition of a mixture of 121 g of ethanol and 12.7 g of water at 30-70° C. under atmospheric pressure. The mixture was stirred under gentle reflux at about 70° C. for about 1 hour. This was followed by the application of a reduced pressure of down to about 1 mbar and the distillative removal of ethanol at a liquid-phase temperature below 60° C. Isolated were 157 g of product with the following properties:

Free ethanol: 0.1% (mass)
Average molar mass: 766 g/mol
Viscosity (20° C.) 22.1 mPa·s
VOC to ASTM D 5095: 0 g/l, 1 g/l
Degree of oligomerization: n*=4, cyclotetrasiloxane
0.8 mol $H_2O$/mol Si Example 2

A 500 ml stirred laboratory reactor with temperature sensor, dropping funnel and reflux condenser was charged under nitrogen blanketing with 200 g of n-octylmethyldichlorosilane, followed by metered addition of a mixture of 121 g of ethanol and 9.5 g of water at 30-70° C. under atmospheric pressure. The mixture was stirred under gentle reflux at about 70° C. for about 1 hour. This was followed by the application of a reduced pressure of down to about 1 mbar and the distillative removal of ethanol at a liquid-phase temperature below 60° C. Isolated were 172 g of product with the following properties:

Free ethanol: 0.1% (mass)
Average molar mass: 678 g/mol
Viscosity (20° C.): 9.0 mPa·s
VOC to ASTM D 5095: 66 g/1
Degree of oligomerization: n*=3.5
0.6 mol $H_2O$/mol Si Example 3

A 500 ml stirred laboratory reactor with temperature sensor, dropping funnel and reflux condenser was charged under nitrogen blanketing with 200 g of n-octylmethyldichlorosilane, followed by metered addition of a mixture of 121 g of ethanol and 7.9 g of water at 30-70° C. under atmospheric pressure. The mixture was stirred under gentle reflux at about 70° C. for about 1 hour. This was followed by the application of a reduced pressure of down to about 1 mbar and the distillative removal of ethanol at a liquid-phase temperature below 60° C. Isolated were 162 g of product with the following properties:

Free ethanol: 0.3% (mass)
Average molar mass: 640 g/mol
Viscosity (20° C.): 6.9 mPa·s
VOC to ASTM D 5095: 72 g/1
Degree of oligomerization: n*=3.3
0.5 mol $H_2O$/mol Si Example 4

A 500 ml stirred laboratory reactor with temperature sensor, dropping funnel and reflux condenser was charged under nitrogen blanketing with 78.6 g of n-propylmethyldichlorosilane, followed by metered addition of a mixture of 69 g of ethanol and 5.4 g of water at 30-70° C. under atmospheric pressure. The mixture was stirred under gentle reflux at about 70° C. for about 1 hour. This was followed by the application of a reduced pressure of down to about 1 mbar and the distillative removal of ethanol at a liquid-phase temperature below 60° C.

Isolated were 54.0 g of product with the following properties:
Average molar mass: 544 g/mol
Viscosity (20° C.): 3.2 mPa·s
VOC to ASTM D 5095: 332 g/l
Degree of oligomerization: n*=4.6
0.6 mol $H_2O$/mol Si

Example 5

A 500 ml stirred laboratory reactor with temperature sensor, dropping funnel and reflux condenser was charged under nitrogen blanketing with 85.5 g of isobutylmethyldichlorosilane, followed by metered addition of a mixture of 69 g of ethanol and 5.4 g of water at 30-70° C. under atmospheric pressure. The mixture was stirred under gentle reflux at about 70° C. for about 1 hour. This was followed by the application of a reduced pressure of down to about 1 mbar and the distillative removal of ethanol at a liquid-phase temperature below 60° C.

Isolated were 63.5 g of product with the following properties:
Average molar mass: 499 g/mol
Viscosity (20° C.) 3.7 mPa·s
VOC to ASTM D 5095: 324 g/l
Degree of oligomerization: n*=3.6
0.6 mol $H_2O$/mol Si

Example 6

A mixture of 80% oligomeric octylmethylsiloxane from Example 1 (0.8 mol $H_2O$/mol Si) and 20% oligomeric IBMDEO (0.6 mol $H_2O$/mol Si) from Example 5 was used.
VOC to ASTM D 5095: 76 g/l

Example 7

A mixture of 90% oligomeric octylmethylsiloxane from Example 1 (0.8 mol $H_2O$/mol Si) and 10% IBTEO from Example 12 was used.
VOC to ASTM D 5095: 63 g/l

Example 8

Comparative Example

Oligomeric octyltriethoxysilane from Example EP 0814110 B1
1.2 mol $H_2O$/mol Si

Example 9

Comparative Example

Oligomeric n-propylsiloxane from EP 1205481 B1
(0.8 mol $H_2O$/mol Si)

Example 10

Comparative Example

Low-viscosity polydimethylsiloxane (dynamically 20 mPa·s at 25° C.) was used.

Example 11

Comparative Example n-Octyltriethoxysilane, a solvent-free, ready-to-use hydrophobizing agent was used.

Example 12

Comparative Example

Isobutyltriethoxysilane, a solvent-free, ready-to-use hydrophobizing agent was used.

Example 13

Comparative Example n-Propyltriethoxysiloxane (1.1 mol $H_2O$/Si), a solvent-free, ready-to-use hydrophobizing agent was used.

Example 14

Comparative Example

At room temperature an aqueous emulsion of an octyltriethoxysilane with 50 wt % active ingredient was introduced into a clean, dry glass vessel and diluted with fully demineralized water, with stirring, to an active ingredient concentration of 20%. The resulting mixture was stirred for a further 10 minutes and could then be used directly.

Example 15

Comparative Example

At room temperature an aqueous emulsion of a propyltriethoxysiloxane with 50 wt % active ingredient was introduced into a clean, dry glass vessel and diluted with fully demineralized water, with stirring, to an active ingredient concentration of 10%.

The resulting mixture was stirred for a further 10 minutes and could then be used directly.

Evaluation of the Examples

Table 1 below sets out the results obtained for the examples given above. For these results, the ready-to-use compositions were treated on concrete cubes (concrete grade according to EN 196 CEM I 42.5 R; w/c=0.5) with dimensions of 5×5×5 cm, with the application rate indicated in each case, by immersion of the cubes. The hydrophobizing properties are expressed by the reduction in water absorption for the individual mixtures. After a setting time of 2 weeks, the treated cubes were stored completely under water for 24 hours. Adhering moisture was removed by gently dabbing the surfaces with a tissue. The increase in weight was then determined. The reduction in water absorption, based on DIN EN 13580, is given by comparison with an untreated concrete cube.

The depth penetration was determined by breaking the treated specimens into two parts and wetting each of the fracture faces within an aqueous ink system. The non-impregnated zone was coloured, while the impregnated zone remained colourless. A measurement was made of the width of the treated surface up to the ink boundary, at eight different points on the specimen. From this measurement, an average was calculated for the depth of penetration (in mm) in each case.

The non-volatile fraction was determined in accordance with ASTM D 5095-91 "Standard Test Method for Determination of the Nonvolatile Content in Silanes, Siloxanes and Silane-Siloxane Blends used in Masonry Water Repellents" and the VOC content was calculated in accordance with ASTM D 3960-04.

Evaluation of alteration or darkening of the surface:

severe>partial>slight>very slight>none

TABLE 1

Results of the tests

| Mixture from Example | Application* [g/m²] | VOC [g/l] | Reduction in water absorption [%] | Depth of penetration [mm] | Alteration or darkening of the surface |
|---|---|---|---|---|---|
| 1 | 113 | 0 | 40 | 2.4 | partial |
| 2 | 120 | 66 | 92 | 2.6 | slight |
| 3 | 127 | 72 | 96 | 2.8 | very slight |
| 4 | 127 | 332 | 13.3 | 2.6 | partial |
| 5 | 120 | 324 | 12.1 | 2.1 | partial |
| 6 | 120 | 76 | 28.7 | 2.7 | partial |
| 7 | 120 | 63 | 88.2 | 3.0 | slight |
| 8 | 113 | 66 | 96 | 2.0 | severe |
| 9 | 133 | 329 | 90 | 3.1 | partial |
| 10 | 113 | 14 | 12 | 1.5 | severe |
| 11 | 167 | 344 | 97 | 4.7 | none |
| 12 | 150 | 400 | 92 | 5.7 | none |
| 13 | 100 | 128 | 93 | 2.0 | severe |
| 14 | 600** | 334 | 87.7 | 1.5 | none |
| 15 | 1200*** | 397 | 23.7 | 0.9 | none |

*Uniform immersion for 4 minutes in the respective product,  and * correspond to about 120 g/L of active ingredient The compositions according to the invention exhibit very low VOC levels, extending down to the lower determination limit of the method. The desired hydrophobizing properties here, for the oligomeric siloxanes, remain comparable with those of monomeric alkylalkoxysilanes, which, however, have very high VOC contents.

Very good values in reducing the water absorption at low VOC contents in conjunction with good depth of penetration and reduced alteration of surface colour were also exhibited by the mixtures from Example 7.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A composition comprising:
a dialkyl-functional siloxane oligomer of formula (I):

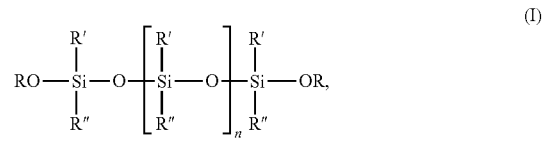

and, optionally,
a dialkyl-functional cyclic siloxane oligomer of formula (II):

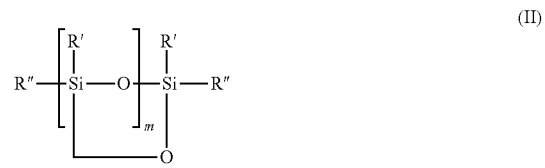

wherein
each R' is independently a linear or branched octyl group,
each R" is a methyl group,
each R is independently hydrogen or an alkyl group having 1 to 2 C atoms,
n is an integer from 0 to 10 and
m is an integer from 2 to 10.

2. The composition according to claim 1, wherein R' is an alkyl group selected from the group consisting of n-octyl, 2-methylheptyl, 3-methylheptyl, 4-methylheptyl, 2,2-dimethylhexyl, 2,3-dimethylhexyl, 2,4-dimethylhexyl, 2,5-dimethylhexyl, 3,3-dimethylhexyl, 3,4-dimethylhexyl, 3-ethylhexyl, 2,2,3-trimethylpentyl, 2,2,4-trimethylpentyl (isooctyl), 2,3,3-trimethylpentyl, 2,3,4-trimethylpentyl, 3-ethyl-2-methylpentyl, 3-ethyl-3-methylpentyl, and 2,2,3,3-tetramethylbutyl.

3. The composition according to claim 2, wherein R' is n-octyl, or 2,2,4-trimethylpentyl(isooctyl).

4. The composition according to claim 1, wherein n is an integer from 1 to 5.

5. The composition according to claim 1, further comprising one or more different
dialkyl-functional linear siloxane oligomers of formula I.

6. The composition according to claim 1, comprising the dialkyl-functional cyclic siloxane oligomer of formula (II).

7. The composition according to claim 6, wherein a molar ratio of the dialkyl-siloxane oligomer of formula I to the dialkyl-functional cyclic siloxane oligomer of formula (II) is from 100:1 to 1:100.

8. The composition according to claim 1, wherein a total wt % of the the dialkyl-siloxane oligomers of the formula I and of the formula II is from 0.01 to 99.9 wt % of the composition.

9. The composition according to claim 1, further comprising an organosilane or organosiloxane of formula (IV):

wherein
$R^1$ is a linear or branched alkyl group having 3 to 20 C atoms,
each $R^2$ is independently a linear or branched alkoxy group having 1 to 4 C atoms or is a hydroxyl group, and y is from 0 to 1.5, z is 0, 1, 2 or 3,
with the proviso that when y is 1.5, z is 0, when y is 1, z is 1, when y is 0.5, z is 2 and when y is 0, z is 3.

10. A process for producing the composition according to claim 1, comprising:
subjecting at least one silane of formula (III) to hydrolysis and condensation in the presence of a diluent or reaction medium and a molar amount of water based on moles of silicon atoms in the silanes of the formula III, and optionally
removing the diluent or the reaction medium:

wherein
R' is a linear or branched alkyl group having 3 to 8 C atoms,
R" is an alkyl group having 1 to 3 C atoms,
each X is independently halogen, —OR or —OH, and
R is independently an alkyl group having 1 to 2 C atoms.

11. The process according to claim 10, wherein
a molar ratio of water to silicon atoms (mol $H_2O$/mol Si) is from 0.3 to 1.0 mol of water per mole of silicon atoms.

12. The process according to claim 10, wherein the diluent or reaction medium comprises an alcohol.

13. The process according to claim 10 wherein X is chlorine.

14. The process according to claim 10, wherein X is —OR and/or —OH and each R is independently an alkyl group having 1 to 2 C atoms.

15. The process according to claim 10 wherein the hydrolysis and/or condensation takes place in the presence of a catalyst.

16. The process according to claim 10, wherein the hydrolysis and/or condensation takes place in a temperature range from 25 to 80° C. and the diluent and/or water is removed from the composition under reduced pressure at a composition temperature of less than or equal to 70° C.

17. The process according to claim 10, further comprising:
adding the diluent or reaction medium and the water in the form of an alcohol/water mixture to the silane of formula (III); or
separately adding the diluent or reaction medium alcohol and water;
carrying out hydrolysis and/or condensation in the temperature range from 25 to 80° C., for 20 minutes to 2 hours; and
removing the diluent or reaction medium alcohol and water under reduced pressure at a liquid-phase temperature below 65° C. to obtain the composition.

18. A method for hydrophobizing a surface of a substrate or for hydrophobizing materials in mass, comprising applying the composition according to claim 1 to the substrate surface or to the material mass.

19. The method according to claim 18, wherein the substrate or material is a mineral building material, a porous mineral substrate, or a silicatic material selected from the group consisting of concrete, fibre cement, clay, brick, marble, granite, sandstone, lime sandstone, bricks, screed, render, plaster, a silicatic composite, ceramics, wood, wood composites and wood polymers.

20. A polymeric composition comprising the composition according to claim 1, wherein the polymeric composition is selected from the group of formulations consisting of a coating material, a composite material, a formulation for forming a water barrier or a water-vapour barrier, an adhesive for forming water and vapour barriers, a drying agent, an anti-foam agent, a care composition adjuvant, a cosmetic formulation, a textile formulation, a formulation for natural or synthetic leather, and a textile or fibre composition adjuvant.

* * * * *